No. 882,786. PATENTED MAR. 24, 1908.
C. D. LOVELACE.
TRAP GUN.
APPLICATION FILED AUG. 1, 1907.
4 SHEETS—SHEET 2.
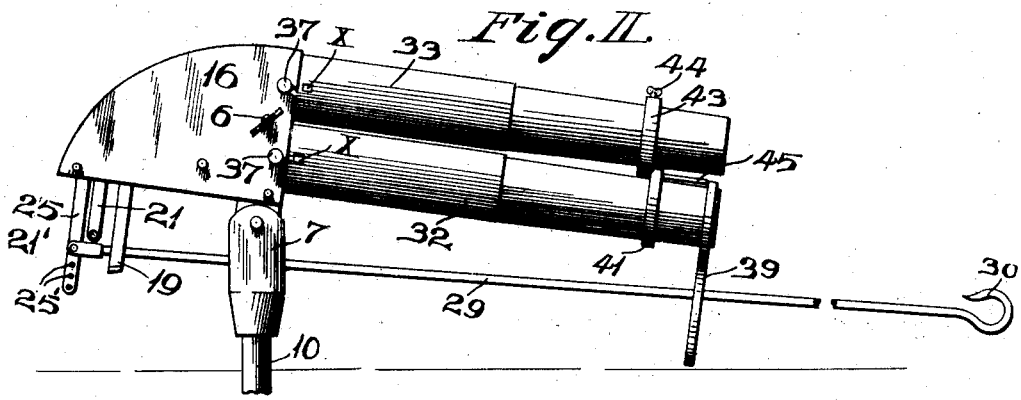
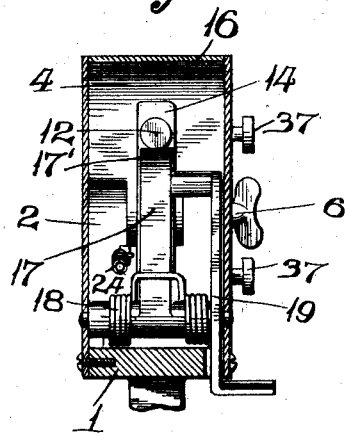
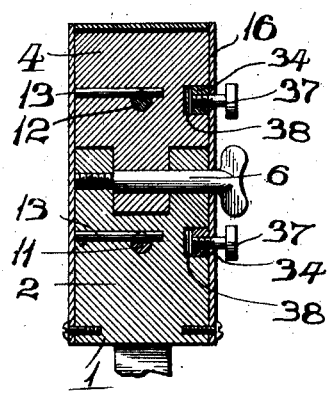
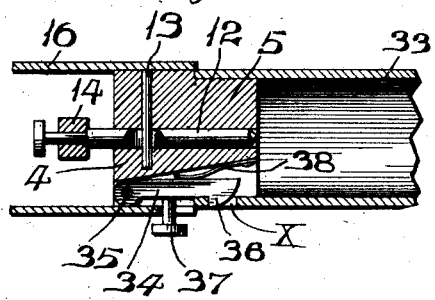
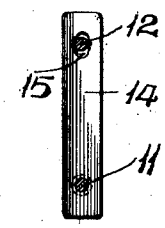
Attest.
H. J. Fletcher
Lily Rost
Inventor.
Chas. D. Lovelace.
By G. W. Knight Att'ys.

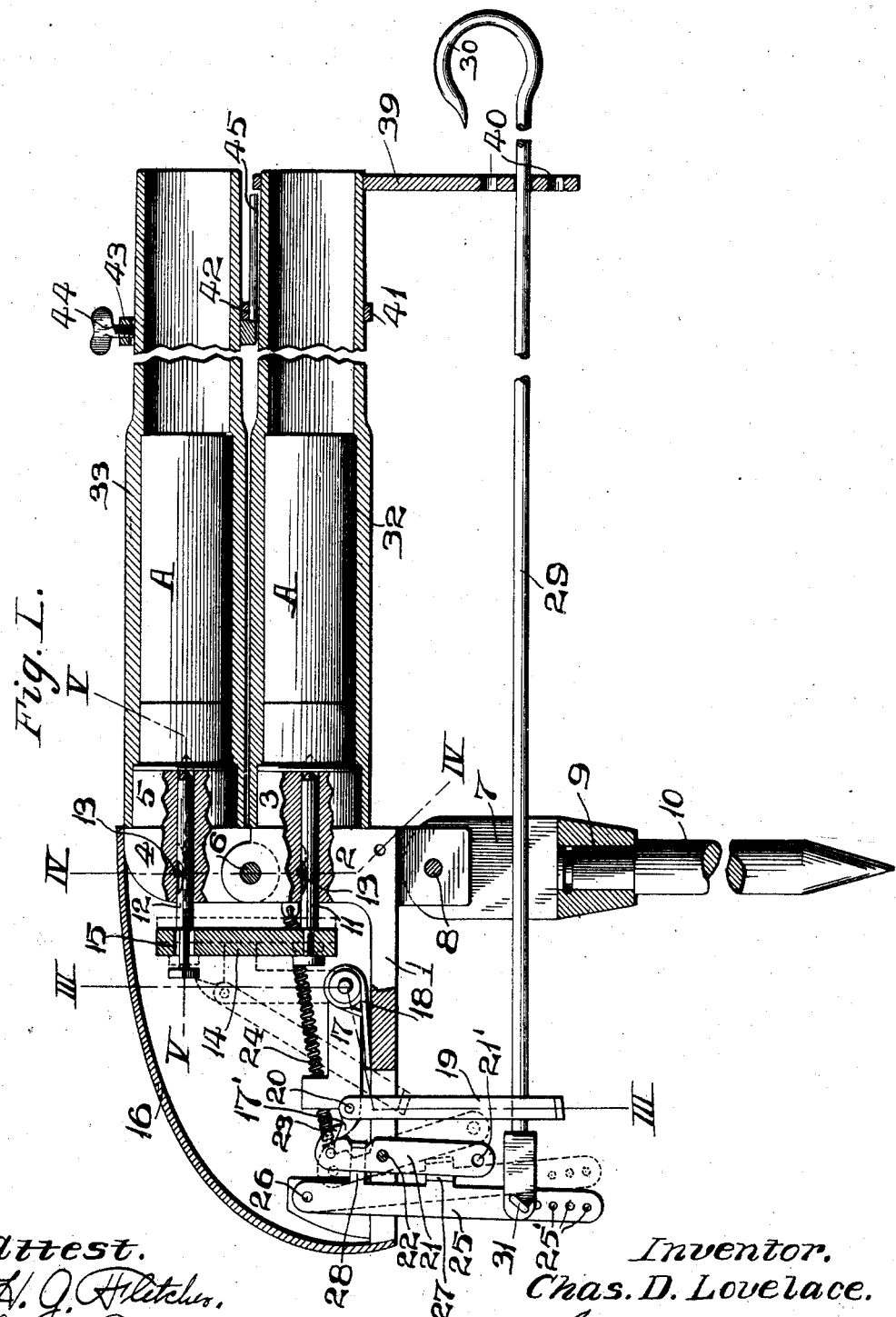

No. 882,786. PATENTED MAR. 24, 1908.
C. D. LOVELACE.
TRAP GUN.
APPLICATION FILED AUG. 1, 1907.
4 SHEETS—SHEET 3.
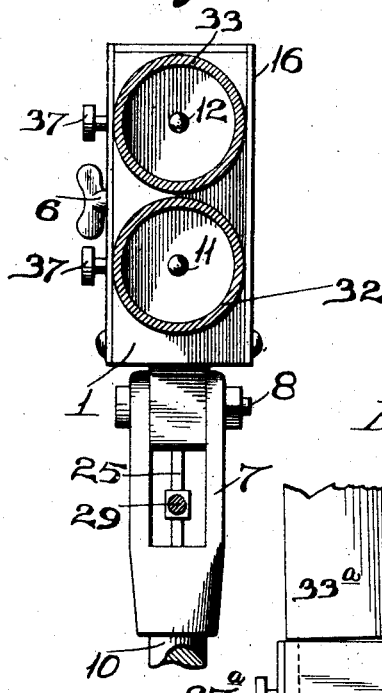
Fig. VII.
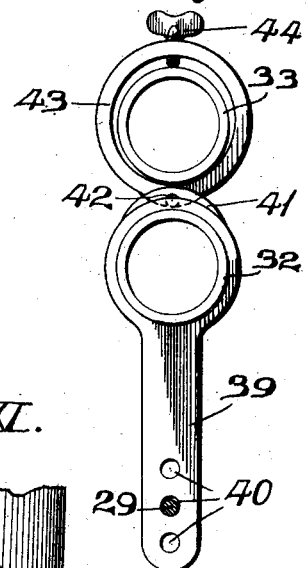
Fig. VIII.
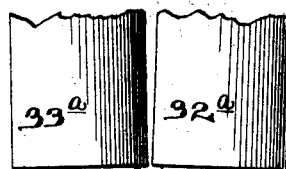
Fig. XI.
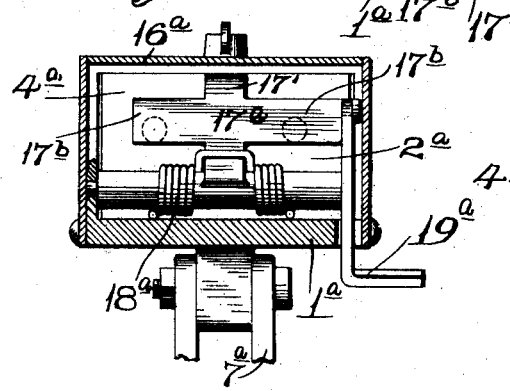
Fig. XII.
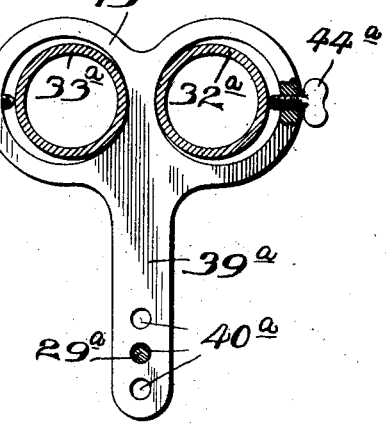
Fig. XIII.
Attest.
H. J. Fletcher
Lily Rost
Inventor.
Chas D. Lovelace.
By G. W. Knight Att'y.

No. 882,786.
PATENTED MAR. 24, 1908.
C. D. LOVELACE.
TRAP GUN.
APPLICATION FILED AUG. 1, 1907.
4 SHEETS—SHEET 4.
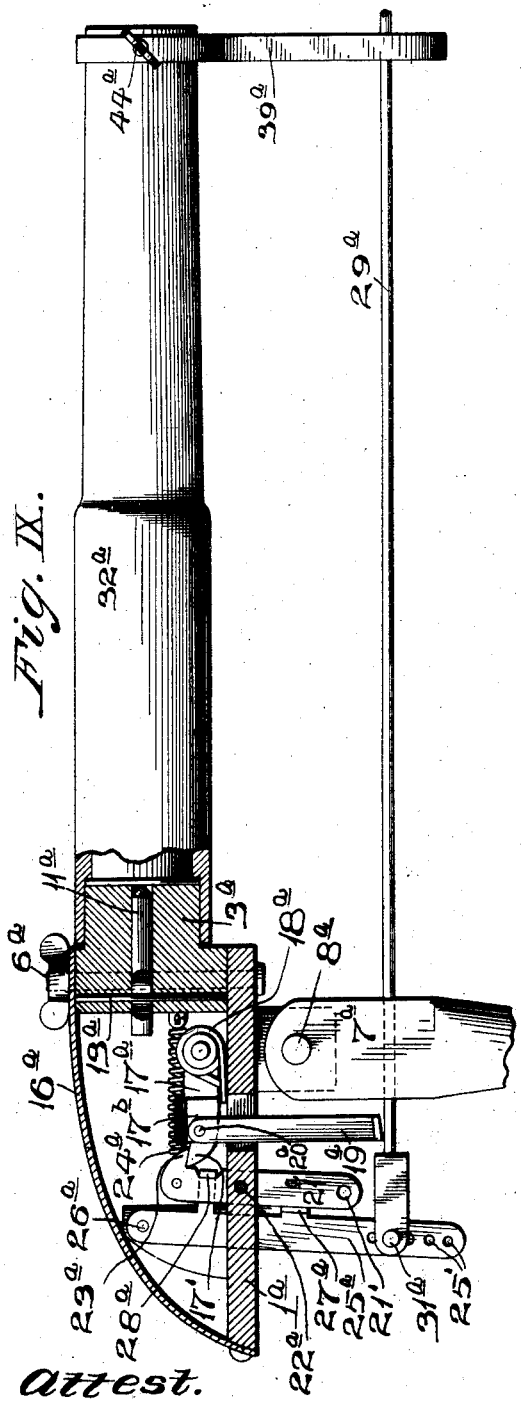
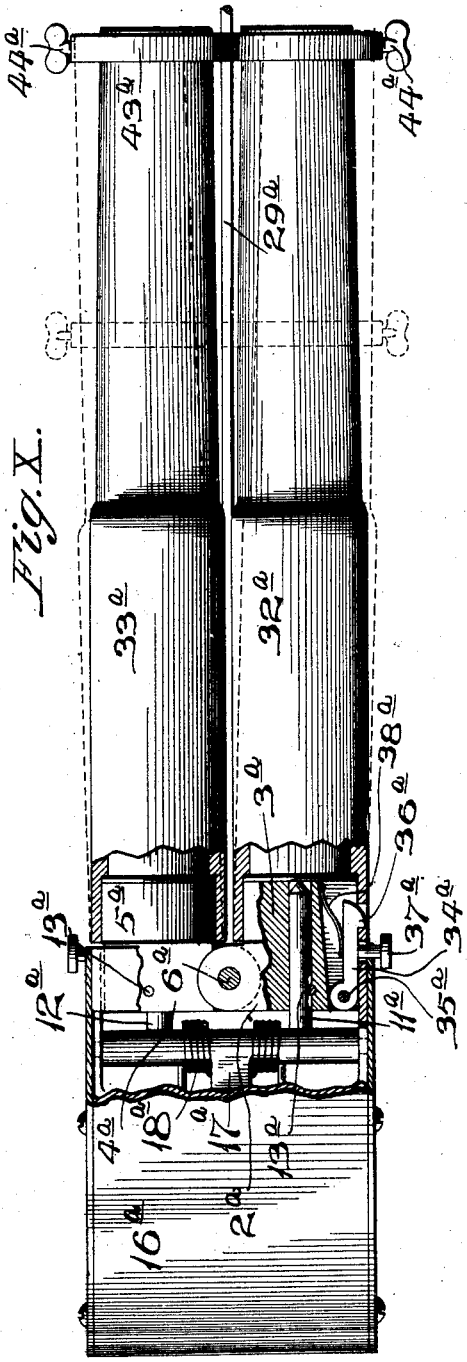
Attest.
H. J. Fletcher.
Lily Rost
Inventor.
Chas. D. Lovelace.
By Geo. H. Knight atty.

UNITED STATES PATENT OFFICE.

CHARLES D. LOVELACE, OF SAN ANGELO, TEXAS.

TRAP-GUN.

No. 882,786.        Specification of Letters Patent.        Patented March 24, 1908.

Application filed August 1, 1907. Serial No. 386,582.

*To all whom it may concern:*

Be it known that I, CHARLES D. LOVELACE, a citizen of the United States of America, residing in the city of San Angelo, county of Tom Green, and State of Texas, have invented certain new and useful Improvements in Trap-Guns, of which the following is a full, clear, and exact description, reference being had to the accompanying drawings, forming part of this specification.

My invention relates to a trap gun for shooting shot, bullets or other projectiles for the purpose of killing either large or small animals when the trigger of the gun is operated by the animal, upon an effort to secure a bait placed upon a member that has connection with the trigger.

The objects of my invention are as follows: First: to construct a trap gun having easily actuated lock mechanism that is effectually secluded from the elements to prevent impairment of the mechanism by moisture. Second: a lock mechanism so constructed as to be unliable to be actuated, except through the medium of the means by which it is intended to be actuated, thereby avoiding accidental or unintentional firing of the trap gun. Third: a trigger which may be actuated either by a push or a pull and which may be actuated by a pull only. Fourth: a trap gun so mounted as to be susceptible of vertical and horizontal movement in order that the muzzle of the gun may be directed to varying elevations and may be moved in a horizontal plane, according to the movements of an animal in attempting to secure a bait associated with the gun.

Other objects in my improvement will fully appear in the following specification.

Figure I is a vertical longitudinal section taken through my gun. Fig. II is a side elevation of the gun. Fig. III is a vertical cross section taken on line III—III, Fig. I. Fig. IV is a vertical cross section taken on line IV—IV, Fig. I. Fig. V is a horizontal longitudinal section taken on line V—V, Fig. I. Fig. VI is an elevation of the union bar associated with the firing pins of the gun, the firing pins being shown in cross section. Fig. VII is in part a front elevation of the breech and the stake pin swivel and in part a vertical cross section taken through the barrels of the gun shown in Figs. I to VI inclusive. Fig. VIII is an end elevation of the muzzles of the gun barrels and the guide and adjustment members associated with said barrels. Fig. IX is in part a longitudinal vertical section and in part an elevation of a modification of the gun shown in Figs. I to VIII inclusive. Fig. X is in part a longitudinal horizontal section and in part a top or plan view of the gun shown in Fig. IX. Fig. XI is a top or plan view of portions of the barrels and lock mechanism of the gun shown in Figs. IX and X. Fig. XII is a vertical cross section taken through the housing of the lock mechanism of the gun shown in Figs. IX to XI inclusive and with the parts of the lock mechanism illustrated in Fig. XI appearing in elevation. Fig. XIII is in part a cross section of the barrels of the modified form of gun and in part an elevation of the gun and adjustment members associated with said barrels.

Referring first to Figs. I to VIII inclusive in the accompanying drawings: 1 designates the breech of my gun which is provided at its forward end with a post 2 that carries a lower breech block 3. 4 is an upper breech block carrier and 5 is an upper breech block that projects forwardly from said carrier. The carrier 4 is hinged at 6 to the post or carrier 2 by which the lower breech block is supported in order that the upper breech block may be moved vertically for a purpose to be hereinafter pointed out. 7 designates a shackle that is pivoted at 8 to the breech 1 and is provided with an eye 9. 10 is a stake pin that is adapted to be introduced into the ground for the support of the trap gun and to which the shackle 7 is swiveled in order that the breech and the remainder of the gun may be moved horizontally while supported by the shackles in a manner to permit vertical movement of the breech and the other parts of the gun, due to the pivotal connection between the breech and shackle. 11 and 12 designate firing pins mounted in the breech blocks 3 and 5 respectively, and slidably held therein by retaining pins 13 that are mounted in the breech block carriers 2 and 4 and occupy notches in the firing pins which are provided to permit the requisite degree of movement of the pins. 14 is a union bar that is fitted to the firing pins near their rear ends and which bears against shoulders upon the pins located in front of the bar. The union bar is provided at its upper end with a vertical slot 15 for the reception of the upper firing pin 12 in order that said firing pin may swing in an arc of a circle when the breech block 5 and its carrier are moved upon the pivot 6. 16 designates a housing that is secured to the breech 1 and serves to inclose said breech, the parts of the lock mechanism just described and the remainder of said lock mechanism to be hereinafter set forth. 17 designates a hammer that is pivotally mounted in the walls of the housing 16, and 18 is a hammer spring by which said hammer is moved forcibly toward the union bar 14 after it has been retracted therefrom. 19 is a pull arm that is pivoted at 20 to the hammer 17 and which extends downwardly from said hammer through the breech 1 to be exposed at the exterior of the breech and its housing, in order that it may be grasped for the purpose of retracting the hammer. 21 is a trigger pivoted at 22 to the breech 1 and provided with a sear 23 located at the upper end of the trigger and adapted to engage a prong 17' projecting from the free end of the hammer 17. The upper end of the trigger is normally held in a forward position by a pull spring 24 that connects the trigger to the breech and maintains the sear of the trigger in a position to be engaged by the prong of the hammer when said hammer is retracted. 25 is a trip lever pivoted at 26 to the breech 1 and through the medium of which the trigger 21 is actuated. This trip lever is provided with an arm 27 located beneath the point of pivotal support of the trigger and which, when the trip arm is moved forwardly, acts upon the trigger in a manner to move its upper end rearwardly and disengage the sear of the trigger from the prong of the hammer 17 thereby freeing said hammer and permitting it to be carried by the spring 18 into impact against the union bar 14 for the actuation of the firing pins 11 and 12. The trip lever 25 is also provided with an upper arm 28 that extends into engagement with the trigger 21 above its point of pivotal support and at the front edge thereof. This upper arm is adapted to exert a pull upon the upper end of the trigger when the trip lever is moved rearwardly, or reversely to the previously stated movement, thereby providing for the actuation of the trigger by either a pulling or pushing action upon the trip lever. 29 designates a bait rod that is provided at its forward end with a hook 30 on which a bait of any description may be placed. This bait rod is connected at its rear end to the trip lever 25 by means of a key 31 adapted to be inserted in either of a series of key holes 25' in the trip lever, the series of key holes being provided in order that variation of leverage action upon said trip lever may be secured. In some instances it may be desirable to provide for a pulling action only in tripping the trigger 21 and to permit of the trigger being actuated only by a pulling movement upon the bait rod 29, I produce in the lower end of the trigger a key hole 21' in order that the bait rod may be connected directly to the trigger instead of being attached to the trip lever 25. 32 and 33 designate respectively lower and upper barrels that are fitted at their rear ends to the breech blocks 3 and 5 and which are adapted to receive cartridge shells A as illustrated in Fig. I. The barrels 32 and 33 are removably fitted to the breech blocks 3 and 5 in order that they may be separated from said blocks for the insertion and removal of cartridge shells. In the rear portion of each barrel is an aperture $x$. In each breech block is a catch arm 34 that is pivoted at 35 to the breech block, as seen in Fig. V, and occupies a groove in the block. Each catch arm is provided with a tooth 36 adapted to enter the aperture $x$ of the barrel to which the catch arm applied and also with a push button 37 by which the catch arm may be pressed inwardly to disengage it from the barrel. Each catch arm is normally pressed outwardly by a spring 38. 39 designates a guide member that is secured to the lower barrel 32 and is provided with a plurality of perforations 40, either of which is adapted to be occupied by the bait rod 29, the several perforations being produced in the guide member in order that the range of the gun in a vertical direction may be varied when a pull is exerted by an animal upon the bait rod according to the elevation of the perforation in which said bait rod is present. The barrels 32 and 33 are formed with tapering forward ends as illustrated most clearly in Fig. II in order that their internal surfaces may be out of parallel with each other. 41 is a ring fixed to the lower barrel 32 and provided at a point above said barrel with a perforation, as illustrated at 42, Fig. VIII. 43 is a sleeve adjustably fitted to the upper barrel 33, preferably secured to said barrel by means of a set screw 44. This sleeve carries a stem 45 that is operable in the perforation 42 of the ring 41.

It has been hereinbefore explained that the upper breech block carrier 4 is pivotally connected to the breech of the gun in order that it may be moved vertically. The object in so mounting said carrier is to provide for the upper barrel of the gun which is fitted to the upper breech block being moved vertically to vary the vertical range of said barrel in order that the projectile discharged from the upper barrel may, when it is desired, be directed at a higher elevation than one discharged from the lower barrel. This is important in using the gun for killing animals larger than those which would be ordinarily within the range of the lower barrel or within the range of the upper barrel when in its lowered position. To accomplish the variation in the elevation of the upper barrel, it is only necessary to shift the adjustable sleeve 43 upon the upper barrel and said barrel being tapered is caused to move upwardly while the stem 45 is being moved in the ring 41. In this connection it is to be noted that the two barrels being entirely independent of each other, said barrels may be loaded differently and a heavy projectile discharged from the upper into a large animal and a smaller projectile from the lower barrel into a small animal.

Referring now to the modification illustrated in Figs. IX to XIII inclusive: 1$^a$ designates the breech of the trap gun that supports the lock mechanism which includes a hammer 17$^a$ that is pivotally mounted in the breech and is controlled by a hammer spring 18$^a$. This hammer is provided with a pair of laterally projecting arms 17$^b$ which are beveled at their forward faces to more effectually at all times, strike the firing pins which are mounted in movable breech blocks, as will hereinafter appear. The remaining parts of the lock mchanism and the bait rod by which the lock mechanism is actuated, are similar to those previously described and are noted in the drawings by the same numerals as those hereinbefore used in the description of the parts with the suffix letter "a" added thereto. 3$^a$ and 5$^a$ designate breech blocks that are located in the same horizontal plane and are pivotally united by a pivot point 6$^a$ which connects the blocks to the breech of the gun. By locating the breech blocks in the same horizontal plane and pivotally connecting them, I provide for said blocks being swung inwardly and outwardly relative to each other for a purpose to be hereinafter mentioned. In the breech blocks 3$^a$ and 5$^a$ are firing pins 11$^a$ and 12$^a$ that are held in place in the blocks by retaining pins 13$^a$. 32$^a$ and 33$^a$ are the gun barrels which are detachably fitted to the breech blocks and held thereto by the catch arms 34$^a$. The forward portion of these barrels are tapered, as most clearly seen in Fig. X. 39$^a$ is a guide member in which the bait rod 29$^a$ is adapted to operate. This guide member is provided at its upper end with a pair of ring arms 43$^a$ connected intermediate of the barrels and having mounted therein set screws 44$^a$. The rings of the guide member are adapted to be moved backwardly and forwardly upon the gun barrels and when so moved they act to spread the barrels in their rearward movement and draw the barrels toward each other in their forward movement, this being due to the forward portion of the barrels being tapered, as explained. It will be seen, with the described mounting of the breech blocks and the provision of the guide member having the ring arms, it is made possible to fire two charges of ammunition from the barrels in close range to each other or at more or less widely separated ranges. This makes it possible to discharge two loads of ammunition into a large animal in close proximity to each other or into the animal at more widely separated points.

I claim:

1. In a trap gun, the combination of a breech provided with a breech block, a barrel attachable to said breech block, a firing pin movable in said breech block, a spring actuated hammer supported by said breech, a pull arm pivoted to said hammer and extending through said breech, a trigger arranged for engagement with said hammer, means whereby said trigger may be actuated, and a housing inclosing said hammer and a portion of said trigger which engages said hammer, substantially as set forth.

2. In a trap gun, the combination of a breech provided with a breech block, a barrel attachable to said breech block, a firing pin operable in said breech block, a spring actuated hammer for operating said firing pin and which is provided with a prong, a trigger pivoted to said breech and having a sear adapted to engage the prong of said hammer, a pull arm pivoted to said hammer and extending through said breech, means whereby said trigger may be actuated, and a housing inclosing said hammer and the sear carrying portion of said trigger, substantially as set forth.

3. In a trap gun, the combination of a breech having a breech block, a barrel attachable to said breech block, a firing pin operable in said breech block, a spring actuated hammer supported by said breech, means whereby said hammer may be retracted, a trigger pivoted to said breech and arranged for engagement with said hammer, a trip lever supported by said breech whereby said trigger may be actuated, and a bait rod whereby said trip lever may be actuated, substantially as set forth.

4. In a trap gun, the combination of a breech having a breech block, a barrel attachable to said breech block, a firing pin operable in said breech block, a spring actuated hammer supported by said breech, means whereby said hammer may be retracted, a trigger pivoted to said breech and arranged for engagement with said hammer, a trip lever supported by said breech whereby said trigger may be actuated, and a bait rod whereby said trip lever may be actuated; said trip lever being provided with a plurality of key holes permitting attachment of said bait rod thereto at different points, substantially as set forth.

5. In a trap gun, the combination of a breech having a breech block, a barrel attachable to said breech block, a firing pin operable in said breech block, a spring actuated hammer supported by said breech, means whereby said hammer may be retracted, a trigger pivoted to said breech and arranged for engagement with said hammer, a trip lever supported by said breech whereby said trigger may be actuated, and a bait rod whereby said trip lever may be actuated; said trip lever being provided with means whereby said trigger is actuated upon either a forward or rearward movement of the lever, substantially as set forth.

6. In a trap gun, the combination of a breech, a pair of breech blocks supported by said breech and one of which is pivotally mounted relative to the other, a pair of barrels attachable to said breech blocks, firing pins operable in said breech blocks, and lock mechanism for operating said firing pins, substantially as set forth.

7. In a trap gun, the combination of a breech, a pair of breech blocks supported by said breech and one of which is pivotally mounted relative to the other, firing pins operable in said breech blocks, lock mechanism for operating said firing pins, barrels attachable to said breech blocks, and means whereby one of said barrels and the breech block to which it is attached may be moved relative to the other barrel and breech block, substantially as set forth.

8. In a trap gun, the combination of a breech, a pair of breech blocks supported by said breech and one of which is pivotally mounted relative to the other, firing pins operable in said breech blocks, lock mechanism for operating said firing pins, barrels attachable to said breech blocks, and means whereby one of said barrels and the breech block to which it is attached may be moved relative to the other barrel and breech block; said last named means comprising a member slidably fitted to one of said barrels and having means for engaging the other barrel, substantially as set forth.

9. In a trap gun, the combination of a breech, a pair of breech blocks supported by said breech and one of which is pivotally mounted relative to the other, firing pins operable in said breech blocks, lock mechanism for operating said firing pins, barrels attachable to said breech blocks, and means whereby one of said barrels and the breech block to which it is attached may be moved relative to the other barrel and breech block; said last named means comprising a ring fitted to one of said barrels and a sleeve adjustably fitted to the other barrel and provided with a stem operable in said ring, substantially as set forth.

CHARLES D. LOVELACE.

In the presence of:
C. C. BREWER,
J. L. MALONE.